Dec. 1, 1931.  F. H. GIBBS  1,833,940
SHOCK ABSORBER
Filed March 20, 1929
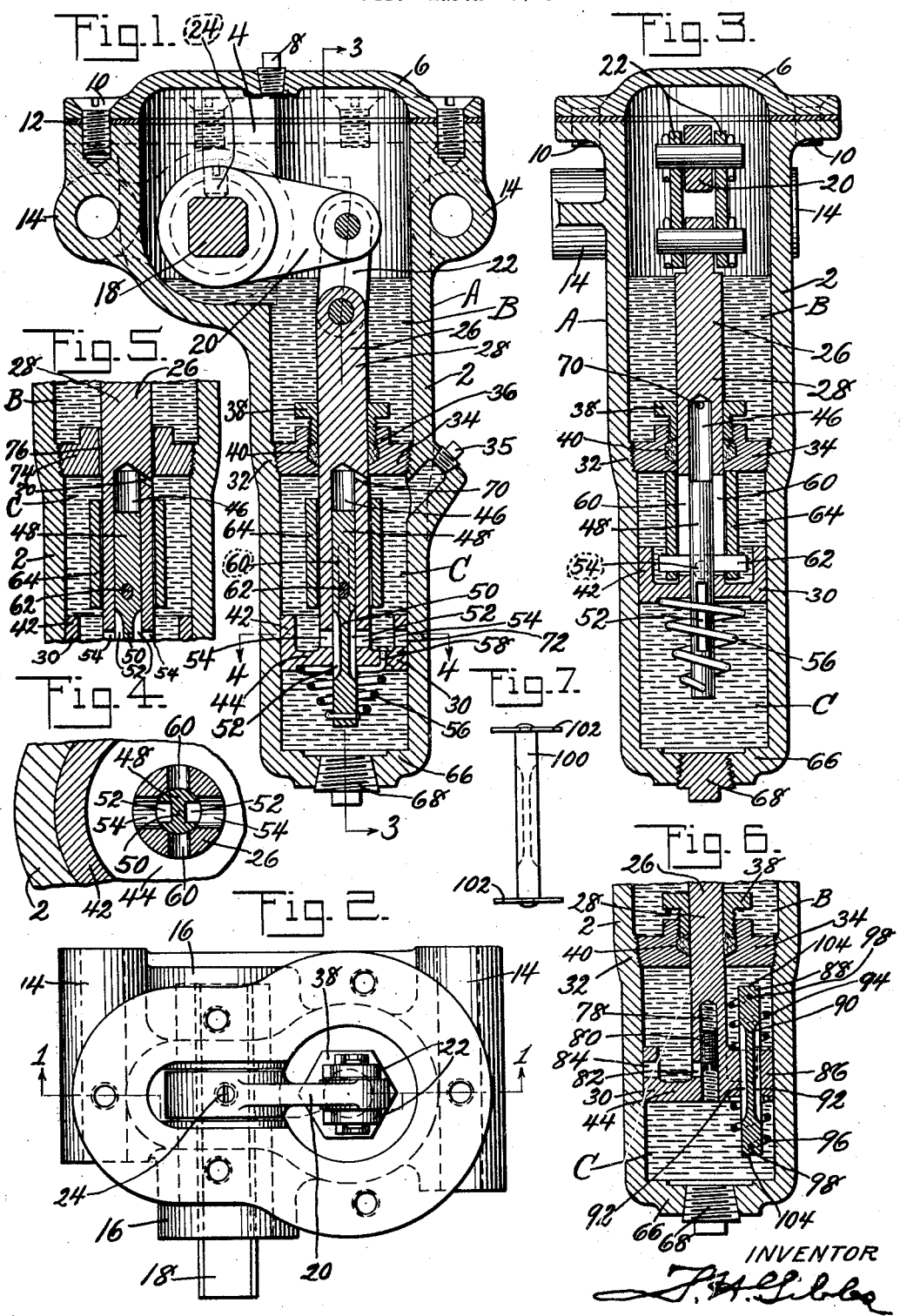
INVENTOR
F. H. Gibbs Patented Dec. 1, 1931

1,833,940

UNITED STATES PATENT OFFICE

FREDERICK H. GIBBS, OF BROOKLYN, NEW YORK

SHOCK ABSORBER

Application filed March 20, 1929. Serial No. 348,583.

This invention relates to shock absorbers for automotive or other vehicles, and has for one object the provision of a two-way acting means for checking excessive rebound of vehicle parts.

Another object of the invention is the provision of a device of the character specified which will afford a progressively increasing resistance to the forces which tend to cause an axle and a vehicle frame to approach or separate.

A further object of the invention is the provision of a shock absorber which will permit slight relative movements between an axle and a vehicle frame to go substantially unchecked, but which will function to check excessive or abnormal relative movements between an axle and a vehicle frame.

A still further object of the invention is the provision of a shock absorber of the two-way type which includes means for checking excessive relative movements between an axle and a vehicle frame near the end of such movements.

Still another object of the invention is the provision of a two-way fluid shock absorber including a piston having means carried thereby which remain substantially inactive during ordinary normal running of the vehicle and permit slight relative movements between an axle and a vehicle frame, which relative movements cause fluid to be forced from one side of the piston to the other, and, during such slight relative movements, said means permit a free flow of said fluid, but which means become active near the end of the stroke of the piston for retarding the flow of fluid from one side of the piston to the other whereby to resist the forces tending to cause the axle and vehicle frame to approach or separate.

Another object of the invention is the provision of a piston type two-way fluid shock absorber having means associated therewith for checking abnormal or excessive relative movements between a vehicle axle and vehicle frame near the end of the stroke of the piston, but which means normally are maintained in a definite relation with reference to the piston regardless of the load to which the vehicle is subjected unless said load is extremely excessive, whereby normal relative movements between a vehicle axle and a vehicle frame, during ordinary travel of the vehicle, are permitted to go unchecked to effect the necessary flexibility and easy riding qualities in a vehicle.

Still another object of the invention is the provision of a shock absorber formed of few parts and which is strong and durable in operation and easy and inexpensive to manufacture.

Other objects and advantages of this invention will be apparent from the following description taken in conjunction with the accompanying drawings in which Figure 1 is a sectional view of the shock absorber, taken on the line 1—1 of Fig. 2;

Fig. 2 is a top plan view of the shock absorber shown in Fig. 1, but having the cover removed therefrom;

Fig. 3 is a sectional view on the line 3—3, Fig. 1;

Fig. 4 is a sectional view on the line 4—4, Fig. 1;

Fig. 5 is a sectional view of a portion of the cylinder of the shock absorber showing a modification of the invention;

Fig. 6 is a sectional view of the lower end of the cylinder of the shock absorber showing a modification of the piston; and Fig. 7 is a front elevation of a modified form of metering pin which can be used in place of the metering pin shown in Fig. 6.

Referring now more in detail to the drawings, while several modifications of the fundamental thought are disclosed therein, the general scheme remains the same and the housing including the parts is substantially identical for each modification. In these drawings in which similar characters of reference designate similar parts in the several views, in Fig. 1 the housing is indicated generally at A and comprises a cylinder 2 which depends from an upper chamber 4, the latter having an open top which is normally closed by a cover 6 provided with a filling opening normally closed by a tapered plug 8. The cover 6 conforms to the shape of the upper edge of the chamber, as will be apparent, and is secured to the housing, more particularly the chamber portion thereof, by screws 10 which pass also through a sealing gasket 12. The chamber 4 is provided with apertured lugs 14 by which the housing may be secured to a vehicle frame (not shown) and said chamber is provided with oppositely disposed bearings 16 for mounting a rock shaft 18 which carries a rocker arm 20 through the end of which latter is pivotally secured a link 22. The rocker arm 20 is preferably maintained in a definite relation with respect to the rock shaft 18 by means of a set screw 24, and the link 22 is pivotally connected at its lower end to the upper end of a rod 26 of a piston indicated generally at 28, and which latter includes a piston head 30. As will be apparent in Fig. 1, the piston 28, link 22 and rocker arm 20 are all contained wholly within the housing A. The rock shaft 18 extends through the bearings 16 and one end thereof is adapted for connection with a vehicle axle by a suitable lever and link connection, not shown, but well understood in the art.

The lower end of the cylinder is reduced in internal diameter, the reduced portion merging into the upper larger end of the cylinder by a beveled portion 32 to which is threadedly secured a tapered and apertured plug 34, serving as an abutment, as will be hereinafter pointed out, and which divides the cylinder into upper and lower chambers B and C, respectively, the chamber B being adapted to hold a suitable lubricating fluid and chamber C also holding a fluid which may be inserted into said chamber through a suitable opening in the wall of the cylinder, which opening is normally closed by a tapered plug 35. As clearly shown in Fig. 1, the rod 26 of the piston 28 is arranged through an aperture formed in the plug 34, and, to prevent leakage between the chambers B and C, respectively, a stuffing box 36 is provided in the plug which includes the gland 38 and the packing 40.

In the type of absorber shown in Figs. 1, 3 and 6, it is the intention to form two distinct chambers, chamber C containing what may be called the working fluid, and chamber B containing merely a lubricant. It is desired with this type of absorber, to provide a liquid tight plug 34 to define a separator between the two chambers B and C, and, to prevent the possibility of leakage, between the chambers at the connection of the plug with the cylinder, the cylinder 2 has been provided with the beveled portion 32 hereinbefore described, the tapered plug being screwed home on the beveled portion 32 and thus effecting a leakproof connection at the joint formed by the connection of the plug with the cylinder 2.

In the instance shown in the drawings, and referring now particularly to Fig. 1, the piston shown comprises the piston rod 26 and the piston head 30, the piston being a unitary structure, and the head 30 of the piston operates in the lower end of the cylinder 2 with a slight clearance therebetween. Preferably, although not necessarily, the piston head 30 is of cup shape, being formed of an annular flange 42 and a web 44. The piston 28, at its lower end, is provided with a central recess 46 which extends through the web 44 and upwardly into the rod 26 for a substantial distance, and within the recess 46 a metering pin 48 is mounted having a reduced area 50 intermediate its ends and preferably, for convenience in mounting, near the lower end thereof. The reduced area 50 defines oppositely disposed elongated recesses 52, as will be apparent, and the piston adjacent the web 44 of the head 30 is provided with a transverse recess 54 which intersects the recess 46, thereby establishing communication from above to below the piston head 30 through the recess 46, as will be obvious.

Fig. 1 discloses the parts in their normal position, and it can be seen that the metering pin 48 is normally positioned in a manner such that the recesses 52 in said pin are in communication with the transverse recess 54 and the opening 46 in the web of the piston whereby to permit communication or free passage of fluid from one side of the piston head 30 to the other, and the metering pin is normally maintained in the position shown in Fig. 1 by means of a double acting spring 56, one end of which is secured to the lower end of the metering pin 48 and the other end is secured to the piston head 30 as shown at 58.

Without further description of the parts of Fig. 1, it will be apparent that because of the specific mounting just described, the metering pin 48 will be maintained in the position shown in Fig. 1, regardless of the load in the vehicle, for, if the piston is elevated or depressed in the cylinder, within limits of course, the metering pin will not move relative to the piston, but will maintain its definite fixed position, which may be termed a zero position. By this is meant that normally the metering pin is arranged in a position relative to the piston such that a free flow of fluid from one side of the piston to the other is permitted.

Adjacent the lower end of the rod 26 are formed oppositely disposed vertical slots 60 which serve as guides for a connecting key 62 arranged through the metering pin and through said slots and having the ends thereof connected with and preferably extended through the lower end of a tubular sleeve 64 which encircles the piston rod with a sufficient clearance therebetween to permit easy movement thereof relative to said rod.

The cylinder 2 is provided with a base or bottom 66 having a centrally disposed discharge outlet normally closed by a plug 68; the plug being tapered for the purpose of preventing leakage from the chamber C to the atmosphere. To permit the escape of fluid which may be trapped in the recess 46 above the upper end of the metering pin 48, a bleed 70 is provided. The flange 42 of the piston head is shown as being provided with an opening 72, but this opening has no particular function and has been formed because necessary in forming the transverse recess 54. This is for convenience in manufacture because with a piston in which the rod and head are formed as a unit, it is not practical to form the transverse opening 54 without boring through the flange 42, but where a piston is used which is formed of independent rod and piston head members, the transverse opening 54 may be formed in the lower end of the piston rod prior to the attachment thereto of the head, as will be obvious.

Fig. 5 discloses a modification of the invention; the cylinder 2 having a tapered plug 74 dividing the cylinder into the compartments B and C, but the plug does not provide a fluid tight separator. The plug 74, shown in Fig. 5, is provided with a central aperture 76 which is slightly larger in diameter than the diameter of the piston rod 26, but which is not of such a diameter as to preclude a running fit of the piston rod 26 with the plug; the opening 76 permitting the passage of fluid from the chamber B to the chamber C, and vice versa. In the type of absorber shown in Fig. 5, the filling plug 35 may be omitted and the cylinder filled with fluid through the filling plug in the cover 6, such as shown in Fig. 1.

Fig. 6 discloses a modification of the lower end of the piston shown in Fig. 1, and in this figure 6 it can be seen that the piston is provided at its lower end with a central recess 78 which extends upwardly through the web of the piston and which supports a plug 80 which may be adjusted therein to vary the passage of fluid from one side of the piston head 30 to the other through the recess 78 and a transverse opening or bleed hole 82 formed in the rod 26 and in communication with the recess 78. In order to bore the opening 82, it is necessary, of course, to bore through the flange of the piston head 30, as shown at 84, but in a piston in which the rod and head are independent members, it is unnecessary to bore the piston head as shown in 84. The head 30, as shown in Fig. 6, is provided with an enlargement 86 which is apertured to provide a bearing for a metering pin 88 provided with a reduced area 90 substantially midway of its ends providing the cut-out portions 92 by which communication from one side of the piston head 30 to the other is established through the enlargement 86. For securing the metering pin to the piston, upper and lower springs 94 and 96 are provided which have their lower ends in engagement with the upper and lower surfaces, respectively, of the enlargement 86, and their opposite ends connected to the ends of the metering pin, as shown at 98. The base 66 of the cylinder shown in Fig. 6 is also provided with a discharge outlet normally closed by the plug 68 and said plug 68, being centrally arranged in the base 66, is therefore alined with the plug 80 in the recess 78 whereby upon removal of the plug 68 a suitable tool may be inserted through the discharge opening to engage the plug 80 to adjust the same in the recess 78 to vary the effective area of the passage in the piston which controls the flow of fluid from one side of the piston to the other. In the instance shown in Fig. 6, the plug 80 varies the transverse opening 82.

Fig. 7 shows a modification of the metering pin shown in Fig. 6 in which the body portion 100 thereof is provided at each end with a spring plate 102 against which the ends of the springs shown in Fig. 6 are adapted to seat.

The operation and construction of the device of the present invention will be clear, it is believed, from the above description, but a brief resume thereof is given. In the device shown in Fig. 1, when applied to a vehicle, when the latter is running normally over an even surface, there will, of course, be slight relative movements between the axle and vehicle frame; which slight movements will, of course, cause a relative movement between the cylinder and piston, but usually these slight relative movements are not sufficient to cause discomfort to passengers. In fact, were every slight relative movement checked by a shock absorber, the easy riding qualities of the vehicle would be reduced because there would be a constant checking. The device of the present invention permits these slight relative movements to go unchecked, as the metering pin 48, shown in Fig. 1, is maintained in its zero or normal position such as disclosed in Fig. 1, whereby, for example, should the piston be lowered slightly in the cylinder 2, the fluid below the piston head 30 will freely pass from below the piston head through the passage in the piston above the piston head. There is substantially no movement of the metering pin relative to the piston during normal operation of the vehicle; at least there is so little relative movement between the metering pin and piston that the fluid passes from one side of the piston to the other at a substantial rate of flow. When, however, the wheels of the vehicle encounter an obstruction of substantial size, the axle and frame approach each other and this causes a considerable relative movement between the piston 28 and the cylinder 2; the piston being elevated in the cylinder or, in other words, the cylinder being lowered with respect to the piston. If the obstruction is of sufficient size, the upward movement of the piston in the cylinder will cause the upper end of the sleeve 64 to engage against the tapered plug 34 and continued upward movement of the piston will, of course, be relative to the metering pin, thereby choking the passage through the piston and checking or retarding the flow of fluid through the passage in the piston head 30 and thus progressively resisting the forces tending to urge the axle and vehicle frame to approach each other. Upon rebound (that is, when the wheels leave the obstruction) there is a reverse relative movement between the piston and the cylinder, as will be apparent, and the piston will be lowered in the cylinder and the metering pin will, of course, move relative to the piston. If the rebound is sufficient to urge the piston head 30 to a very low position, it will be apparent that the lower end of the metering pin will engage the base of the cylinder 66 and be urged upwardly in the recess 46, thereby choking the passage through the piston and obviously checking or retarding the passage or rate of flow through the piston.

In Fig. 6 there is provided, in addition to the normal passage through the piston provided by the cut-out portions 92 of the metering pin, a supplemental or auxiliary passage or bleed hole 82 which permits a continuous passage of fluid from one side of the piston to the other during normal travel of the vehicle in which slight relative movements between the piston and cylinder take place. This flow may be adjusted to suit desired or required conditions by varying the effective area of the opening 82. The metering pin shown in Fig. 6 functions, as does the metering pin shown in Fig. 1, so no further description thereof seems to be necessary. However, with the construction shown in Fig. 6, it is apparent that various types of metering pins may be used dependent upon required conditions or the weight of the car. Further, dependent upon desired conditions, the springs 94 and 96 may be changed. The upper and lower ends of the metering pin shown in Fig. 6 provide, of course, impact surfaces 104 against which the fluid in the chamber C acts during relative movements between the piston and cylinder. The impact against these surfaces may be sufficient to cause a relative movement between the metering pin and the piston rod, and, in fact, in some cases, this may be desirable. This relative movement may be predetermined by the use of springs of predetermined capacity, as the capacity of the springs used with the device in Fig. 6 determines the movement of the metering pin relative to the piston during normal movement of the vehicle. The construction shown in Fig. 6 is such that the metering pin may be easily changed in accordance with the weight of the car with which the absorber is used. If the metering pin shown in Fig. 7 is employed in the construction shown in Fig. 6, it is advisable to employ springs of predetermined capacity, inasmuch as the heads 102 of the metering pin 100 furnish positive impact surfaces which might cause an excessive relative movement of the metering pin with respect to the piston. In view of these impact surfaces and the possibility of excessive relative movement of the pin, it is obvious that the movement of the pin relative to the piston may be determined under normal conditions for a car of predetermined weight, and springs of predetermined capacity may be employed to effect proper operation of the shock absorber.

With the construction shown in Figs. 1, 3 and 5 the sleeve 64 is, of course, interchangeable and sleeves of varying length dependent upon the extent of spring movement in compression and expansion as well as the weight of the car with which the absorber is to be used, may be employed.

The plug 34 serves as a stop, and also serves as a guide for the rod of the piston thereby holding its head in correct position with relation to the cylinder walls between which and the piston head such clearance is provided as may be desired depending upon whether or not it is considered necessary to permit flow of liquid from one side of the piston head to the other between the cylinder and piston head.

The drawings herein disclose the preferred embodiment of the invention, but it is to be understood that they are for illustrative purposes only and that various changes in the form and proportions of the device may be made within the scope of the appended claims without departing from the spirit of the invention.

What is claimed is:

1. In a shock absorber, a housing providing a fluid holding cylinder having a fixed abutment intermediate its ends, a piston assembly therein having an aperture for the passage of fluid, and flow controlling means in said aperture movable simultaneously with the piston assembly for a portion only of its stroke and permitting unretarded passage of the fluid through the aperture and adapted to contact with the fixed abutment whereby to permit movement of the piston relative to the flow control means near the end of the stroke of the piston for retarding the passage of fluid through the aperture.

2. In a shock absorber, a housing providing a fluid holding cylinder, a piston in said cylinder and including a piston rod positioned and guided wholly therein and a fluid passage, and flow restricting means in said passage normally maintained in substantially definite relation with respect to the passage for permitting a definite rate of flow of liquid through the passage and said piston being movable relative to the flow restricting means near the end of the piston stroke to vary the rate of flow through said passage in accordance with the stroke of the piston.

3. In a shock absorber, a housing providing a liquid holding cylinder having a bottom defining a lower abutment, a piston in the cylinder and having a passage therethrough, said piston including a piston rod contained wholly within the cylinder, a piston rod guide in the cylinder defining an upper abutment, and means in the passage normally maintained in definite relation with respect to the piston to permit free passage of the fluid therethrough and adapted to contact with the abutments during the strokes of the piston whereby to move the said means relative to the piston to vary the area of the passage.

4. In a shock absorber, a housing providing a fluid holding cylinder, a piston therein having a fluid passage and including a piston rod, a piston rod guide in said cylinder, and a metering pin in the fluid passage normally maintained in a definite relation with respect to the piston to permit free flow of fluid through the passage and adapted to be actuated relative to the piston by said guide during movement of the piston to vary the area of the fluid passage.

5. In a shock absorber, a fluid containing cylinder, a piston reciprocable therein and provided with a fluid passage and a bleed hole, adjustable means in the bleed hole for varying the effective area thereof, and a metering pin in the fluid passage resiliently connected to the piston to permit a substantially free flow of fluid through the piston for a portion of the piston stroke in both directions.

6. In a shock absorber, a fluid containing cylinder, a piston therein having a bleed hole and a fluid passage, means for varying the effective area of the bleed hole, and means in the fluid passage normally maintained in a definite relation therewith for permitting a substantially definite flow of fluid therethrough, said means normally moving with the piston during normal movement thereof and being held stationary with respect to the cylinder during abnormal movement of said piston.

7. In a shock absorber, a housing providing a fluid holding cylinder having a normally closed opening in one end thereof, a piston reciprocable in the cylinder and provided with a bleed hole and a main fluid passage, means in the piston adjustable through the cylinder opening for varying the effective area of the bleed hole, and means in the main fluid passage operable near the ends of the piston strokes for retarding the flow of fluid through the main fluid passage.

8. In a shock absorber, a housing providing a fluid holding cylinder having a normally closed opening in one end thereof, a piston reciprocable in the cylinder and provided with a bleed hole and a main fluid passage, means in the piston adjustable through the cylinder opening for varying the effective area of the bleed hole, and means in the main fluid passage operable near the ends of the piston strokes for retarding the flow of fluid through the main fluid passage in accordance with the stroke of the piston.

9. In a shock absorber, a housing providing a fluid holding cylinder, a piston assembly therein having a fluid passage and a bleed hole, adjustable means for varying the effective area of the bleed hole, and a metering pin in the fluid passage normally maintained in a definite position with respect to the assembly to permit a definite rate of flow or fluid through the passage and movable relative to the assembly near the end of the stroke thereof to vary the flow of fluid through the passage.

10. In a shock absorber, a fluid holding cylinder, a piston reciprocable therein and provided with a main fluid passage and a bleed hole, means in the main fluid passage normally retained in a definite relation thereto to normally permit a definite rate of flow through said passage, means in the cylinder with which the first named means is adapted to contact upon abnormal movement of the piston to move the latter relative to the piston to choke the main fluid passage and retard the flow of fluid therethrough, and means in the piston for varying the effective area of the bleed hole.

11. In a shock absorber, a housing providing a fluid holding cylinder having an opening in the lower end thereof, a plug normally closing said opening, a piston in the cylinder having a bleed hole, and means for regulating the effective area of the bleed hole, said means being alined with the cylinder opening whereby to permit the insertion of a tool for adjusting said regulating means.

12. In a shock absorber, a cylinder, a piston reciprocable therein, a yieldingly mounted metering pin carried by the piston and adapted to contact with a wall of the latter, a bleed hole in the piston, and means for varying the effective area of the bleed hole.

13. In a shock absorber, a fluid holding cylinder providing a stop at its lower end, a guide in said cylinder intermediate the ends thereof and providing a stop, a piston reciprocable between said stops and having a piston rod arranged through the guide, said piston having a main fluid passage therethrough, a yieldingly mounted metering pin arranged in the passage and adapted to contact with said stops to vary the effective area of the main fluid passage.

14. In a shock absorber, a fluid holding cylinder providing a stop at its lower end, a guide in said cylinder intermediate the ends thereof and providing a stop, a piston reciprocable between said stops and having a piston rod arranged through the guide, said piston having a main fluid passage therethrough, a yieldingly mounted metering pin arranged in the passage and adapted to contact with said stops to vary the effective area of the main fluid passage, a bleed hole in the piston, and means carried by the piston for regulating the effective area of the bleed hole.

15. In a shock absorber, a fluid holding cylinder, a piston movable therein and having a fluid passage, a metering pin yieldingly connected to the piston and arranged in the fluid passage, said pin normally permitting substantially unrestricted flow of fluid through said passage, and means in said cylinder with which the metering pin contacts upon abnormal movements thereof for causing maximum closure of the fluid passage for varying the flow of fluid through the passage in accordance with the stroke of the piston.

16. In a shock absorber, a housing providing a fluid holding cylinder, a piston therein having a fluid passage, flow control means in said passage normally maintained in definite relation with respect to the piston for permitting a definite rate of flow of fluid through the passage during a portion of the stroke of the piston, and an abutment intermediate the ends of the cylinder with which said flow control means contacts after partial movement of the piston to retain the flow control means fixed relative to said cylinder during continued movement of the piston for varying the flow of fluid through the passage.

17. In a shock absorber, a housing providing a fluid holding cylinder, a fixed abutment in the cylinder intermediate the ends thereof, a piston in the cylinder having a fluid passage therethrough and provided with a piston rod, and means in said passage permitting free flow of fluid therethrough for a portion of the piston stroke, said means being adapted to contact with the abutment near the end of the piston stroke for gradually restricting the passage to vary the rate of flow therethrough.

18. In a shock absorber, a housing providing a fluid holding cylinder, a fixed abutment in the cylinder intermediate the ends thereof, a piston in the cylinder having a fluid passage therethrough and provided with a piston rod extending through the abutment, and means in said passage permitting free flow of fluid therethrough for a portion of the piston stroke, said means being adapted to contact with the abutment near the end of the piston stroke for gradually restricting the passage to vary the rate of flow therethrough.

19. In a shock absorber, a fluid holding cylinder, a piston therein provided with a port, flow control means arranged in said port, and fixed means intermediate the ends of the cylinder with which said flow control means contacts during a portion of the upward movement of the piston.

20. In a shock absorber, a fluid holding cylinder, a piston therein provided with a port, flow controlling means arranged in said port, and fixed means intermediate the ends of the cylinder with which said flow controlling means contacts during a portion of the movement of the piston for increasingly restricting the passage of fluid through the port.

21. In a shock absorber, a fluid containing cylinder, a piston reciprocable therein and provided with a fluid passage and a bleed hole, adjustable means in the bleed hole for varying the effective area thereof, and a metering pin in the fluid passage resiliently connected to the piston with its zone of least diameter normally arranged in said passage.

In witness whereof I have hereunto set my hand.

FREDERICK H. GIBBS.